US006839694B2

(12) United States Patent
Kasmin et al.

(10) Patent No.: US 6,839,694 B2
(45) Date of Patent: Jan. 4, 2005

(54) SYSTEM AND METHOD FOR WEIGHING ITEMS SUCH AS MAILPIECES IN THE PRESENCE OF EXTERNAL VIBRATION

(75) Inventors: Michael J. Kasmin, Milford, CT (US); Edilberto I. Salazar, Brookfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 208 days.

(21) Appl. No.: 10/165,532

(22) Filed: Jun. 7, 2002

(65) Prior Publication Data

US 2003/0229601 A1 Dec. 11, 2003

(51) Int. Cl.[7] .............................................. G07B 17/00
(52) U.S. Cl. ...................... 705/407; 177/1; 177/25.11; 177/25.15; 177/25.13; 702/173; 702/175; 705/415
(58) Field of Search ....................... 177/1, 25.11, 25.15, 177/25.13; 702/173, 175; 705/401, 407, 415, 414

(56) References Cited

U.S. PATENT DOCUMENTS

| | | | |
|---|---|---|---|
| 4,347,903 A | * 9/1982 | Yano et al. ............... 177/25.13 |
| 4,351,033 A | 9/1982 | Uchimura et al. .......... 364/900 |
| 4,516,209 A | 5/1985 | Scribner ..................... 364/466 |
| 4,742,878 A | 5/1988 | Freeman et al. .............. 177/25 |
| 4,787,048 A | 11/1988 | Freeman et al. ............. 364/466 |
| 5,119,306 A | 6/1992 | Metelits et al. ........ 364/464.02 |
| 5,172,783 A | 12/1992 | Feinland et al. ............ 177/185 |
| 5,178,228 A | 1/1993 | Feinland et al. ............ 177/185 |
| 5,226,496 A | * 7/1993 | Feinland et al. ......... 177/25.15 |
| 5,717,166 A | 2/1998 | Talmadge ................ 177/25.13 |
| 5,723,825 A | 3/1998 | Dolan et al. ................. 177/145 |

FOREIGN PATENT DOCUMENTS

| | | | |
|---|---|---|---|
| JP | 60-152920 | * | 8/1985 |
| JP | 63-214623 | * | 9/1988 |

OTHER PUBLICATIONS

News Release "Expand Your Measurements Horizons with the new Omega DP–80 Series Digital Indicators"; Aug. 21, 1986.*

* cited by examiner

*Primary Examiner*—Edward R. Cosimano
(74) *Attorney, Agent, or Firm*—Brian A. Lemm; Angelo N. Chaclas

(57) ABSTRACT

A system and method for weighing of items such as mailpieces in the presence of external vibration such as ground noise. The system includes a scale system having a platform connected to a load cell, which provides an output signal to an analog-to-digital converter. The resulting digital output signal is processed by a low pass filter and analyzed by a microprocessor to determine weights of items on the platform. The microprocessor also determines postage amounts as functions of the weights and outputs these postage amounts to a postage meter. The microprocessor determines the weights as the median of the peak to valley difference of the digital output signal when the digital output signal peak to valley difference is less than a predetermined value. The microprocessor identifies peaks and valleys of the digital output signal by determining when the derivative of the signal changes sign. The microprocessor estimates the weight as an average of a sum of medians for N preceding cycles if the digital output signal does not converge.

16 Claims, 7 Drawing Sheets

SYSTEM AND METHOD FOR WEIGHING ITEMS SUCH AS MAILPIECES IN THE PRESENCE OF EXTERNAL VIBRATION

BACKGROUND OF THE INVENTION

The present invention relates to a system and method for rapid weighing of items. More particularly it relates to scale systems used in postage metering systems to weigh, and determine postage for, mailpieces or the like.

Postal scale systems are well known. Such scale systems weigh a mailpiece and determine the appropriate postage for that mailpiece as a function of the weight. Postal mailing systems where a mailpiece is transported onto a postage scale system, the appropriate postage is determined, and the mailpiece is then transported to postage metering system for imprinting with a postal indicium representative of the postage determined are also known. One such system is described in U.S. Pat. No. 4,742,878; issued May 10, 1988. In such systems there is a constant need to increase the rate at which the scale can determine the weight of a mailpiece in order that the throughput of the system can be increased.

U.S. Pat. No. 4,787,048; issued: Nov. 22, 1988, discloses one approach to decreasing the time required for a postage scale system to determine the weight of a mailpiece. The system disclosed in this patent takes advantage of the structure of postage rate charts, i.e., the function that relates the weight of the mailpiece to the appropriate postage amount. Such rate charts provide a constant postage value for all weights between a pair of predetermined weight breaks. The system of the '048 patent takes advantage of this by use of an algorithm where a first estimate of the weight is made and used to determine the postage amount unless the first estimate is within a predetermined distance of a break point, in which case a second more accurate estimate is made.

A basic cause of the delay in determining weight for a mail piece is the tendency for a scale system to oscillate in response to the arrival of the mailpiece on the system. These oscillations are damped, but only slowly arrive at a new stable output value representative of the weight of the mail piece. Heretofore systems have relied on an averaging process over a number of samples taken over a number of cycles of the oscillations to approximate the weight output. While systems using such averaging type algorithms have generally proved satisfactory in the past, presently they are approaching limits such that it is difficult to increase the throughput of postage metering systems using such algorithms. This problem is exacerbated by the presence of external (e.g. ground) vibrations, which can slow or even prevent the scale system output from converging to a sufficiently accurate approximation of the weight.

Thus it is the object of the present invention to provide a scale system, and a postage metering system incorporating such scale system, which can determine the weight of a mailpiece or the like even in the presence of external vibrations which would delay or prevent convergence of the system output.

BRIEF SUMMARY OF THE INVENTION

The above object is achieved and the disadvantages of the prior art are overcome in accordance with the subject invention by a method and system for determining a weight for an item, where a scale system generates a digital output signal. The scale system includes: a support for supporting the item; a transducer for generating the digital output signal, the signal being representative of an instantaneous response of the support; a data processing system for, in response to the digital output signal, detecting presence of the item on the support; and then b) a data processing system for, in response to said digital output signal: b1) detecting presence of said item on said support; then b2) determining if said digital output signal is approaching a steady value; and, if so b3) determining said weight to be equal to a function of said digital output signal, and exiting; otherwise b4) determining a predetermined number of medians of successive peak, valley pairs; then b5) determining said weight to be an average of said predetermined number of medians, and exiting.

In accordance with one aspect of the present invention, said predetermined number is approximately 20.

In accordance with another aspect of the present invention, said peaks are identified by determining when a first derivative of said digital output signal changes from positive to negative, and said valleys are identified by determining when said first derivative changes from negative to positive.

In accordance with another aspect of the present invention, values for said predetermined number of medians, or values for corresponding peaks and valleys, are determined and stored prior to determining whether or not said digital output signal is approaching said steady value.

In accordance with another aspect of the present invention, if said digital output signal is approaching said steady value, said weight is determined to be equal to a function of said predetermined number of medians.

In accordance with another aspect of the present invention the system further comprises a postage metering system responsive to said data processing system for franking said mailpieces, said postage meter responding to detection of said mailpiece on said support to debit a vault for a postage amount corresponding to said weight.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
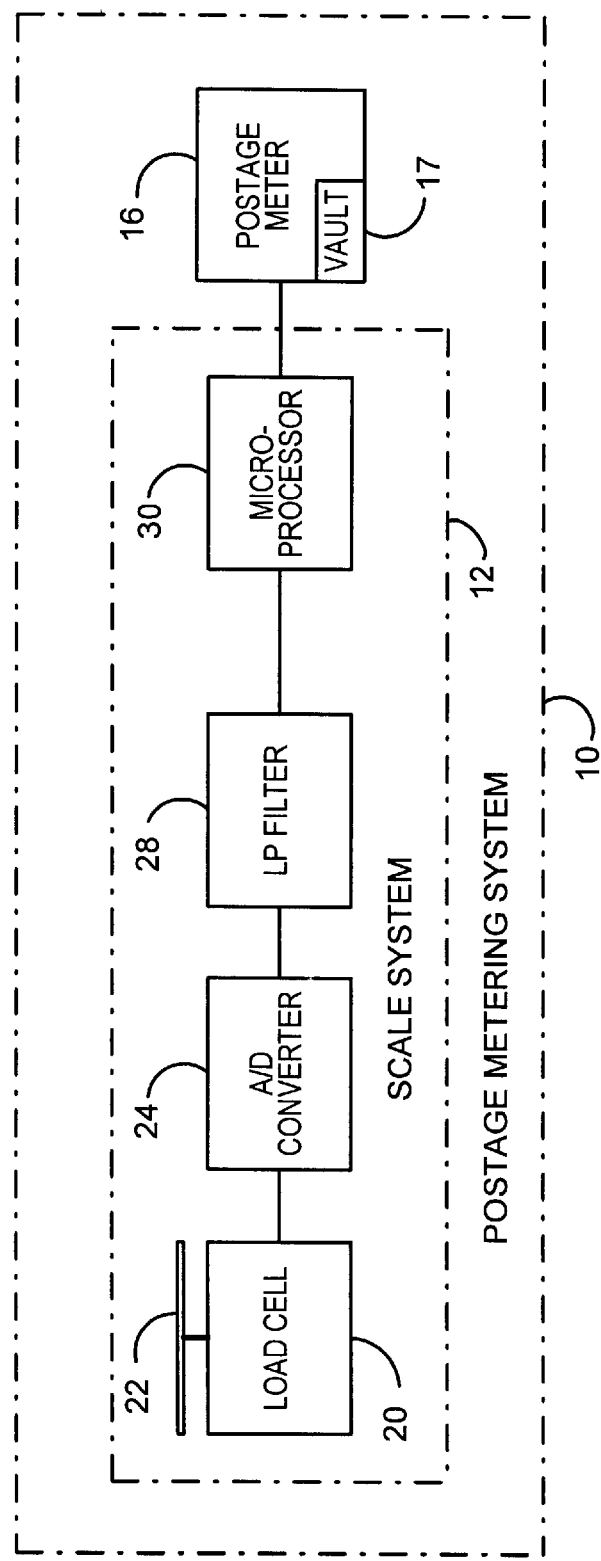
FIG. 1 shows a schematic block diagram of a postage metering system including a scale system.

In FIG. 1 postage metering system 10 includes scale system 12 and postage meter 16. Postage meter 16 includes vault 17 (i.e. secure accounting registers). Scale system 12 includes load cell 20, producing a response (shown in FIGS. 2 and 4) to the force from platform 22; analog-to digital converter 24, for converting the output of load cell 20 to a sequence of digital values; low pass filter 28; and microprocessor 30, for processing a filtered output to determine a weight and provide an output representative of the postage corresponding to that weight to postage meter 16. (While filter 28 is shown as a separate element in FIG. 1 for simplicity of illustration, it should be noted that filter 28 can be, and preferably is, implemented by software running in microprocessor 30.)

Figure 2:
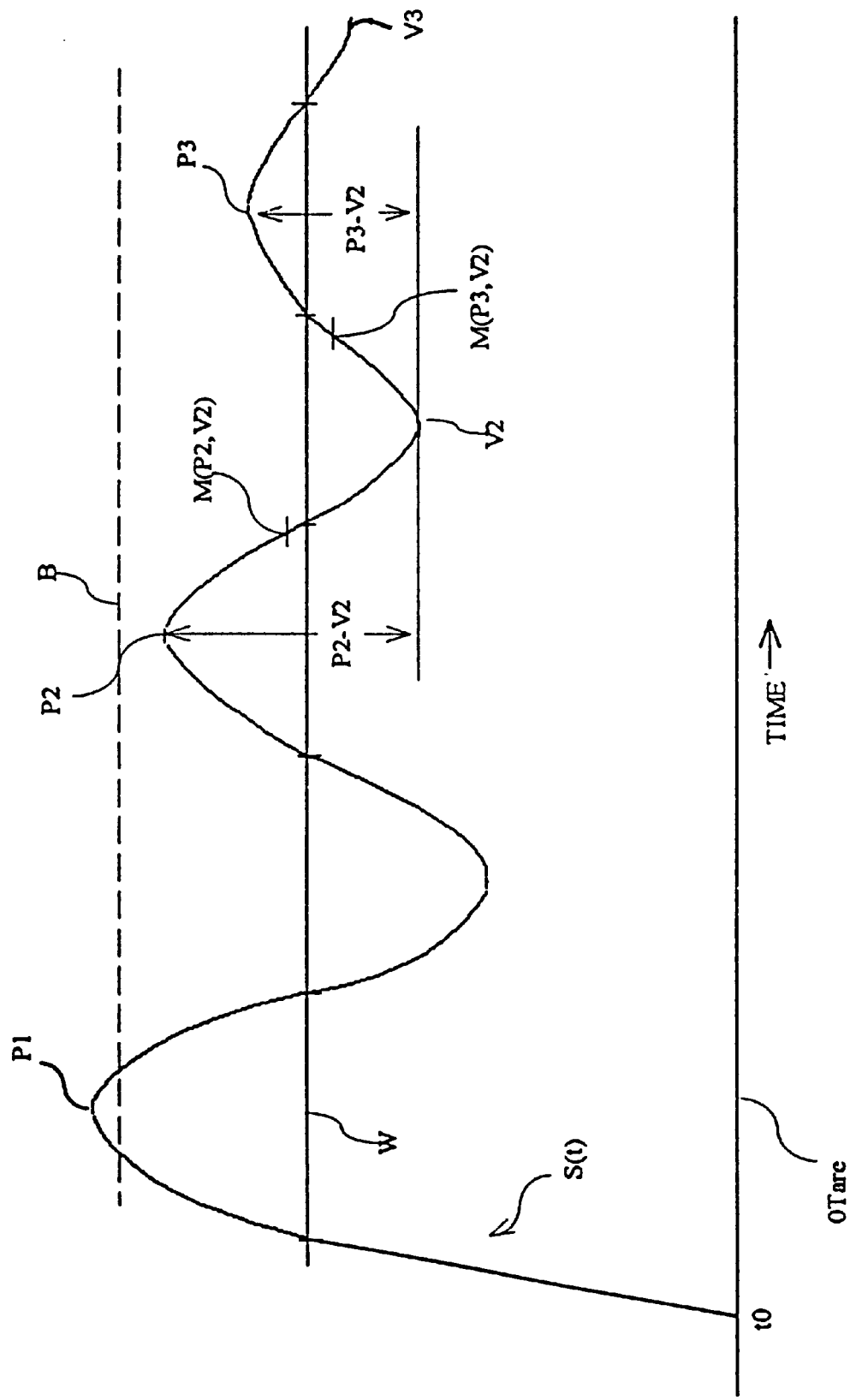
FIG. 2 shows a graphic representation of the response of the scale system of FIG. 1 to a mailpiece.

FIG. 2 shows the response of scale system 12 when a mailpiece arrives on platform 22, i.e., the displacement of platform 22 and the corresponding analog signal S(t) produced by load cell 20. Signal S(t) can be modeled as a damped sinusoid, which varies about a level W representative of the weight of the mailpiece. Prior to time t0 signal S(t) varies about a 0 tare level representative of the weight of platform 22 without any additional load, and at time t0 rises to first peak P1. Since scale system 12 will be critically damped, or overdamped, peak P1 will be the maximum value of signal S(t); and, if peak P1 does not exceed first break weight B, it can be assumed that the weight of the mailpiece is in a lowest range and the mailpiece will require minimum postage. If P1 exceeds break weight B then, in accordance with the present invention, scale system 12 estimates the weight of the mailpiece by considering the difference between successive peaks and valleys; P2-V2, P3-V2, P3-V3 . . . When this difference is less than a predetermined amount for a peak, valley pair, Px, Vy, then scale system 12 estimates the weight as the median of that peak, valley pair, M(Px, Vy), e.a., M(P2, V2), M(P3, V2). Preferably the predetermined value is a fraction, preferably $\frac{1}{10}$, of the minimum range for a given postal rate, typically one ounce, and the first break weight is one ounce.

Figure 3A:
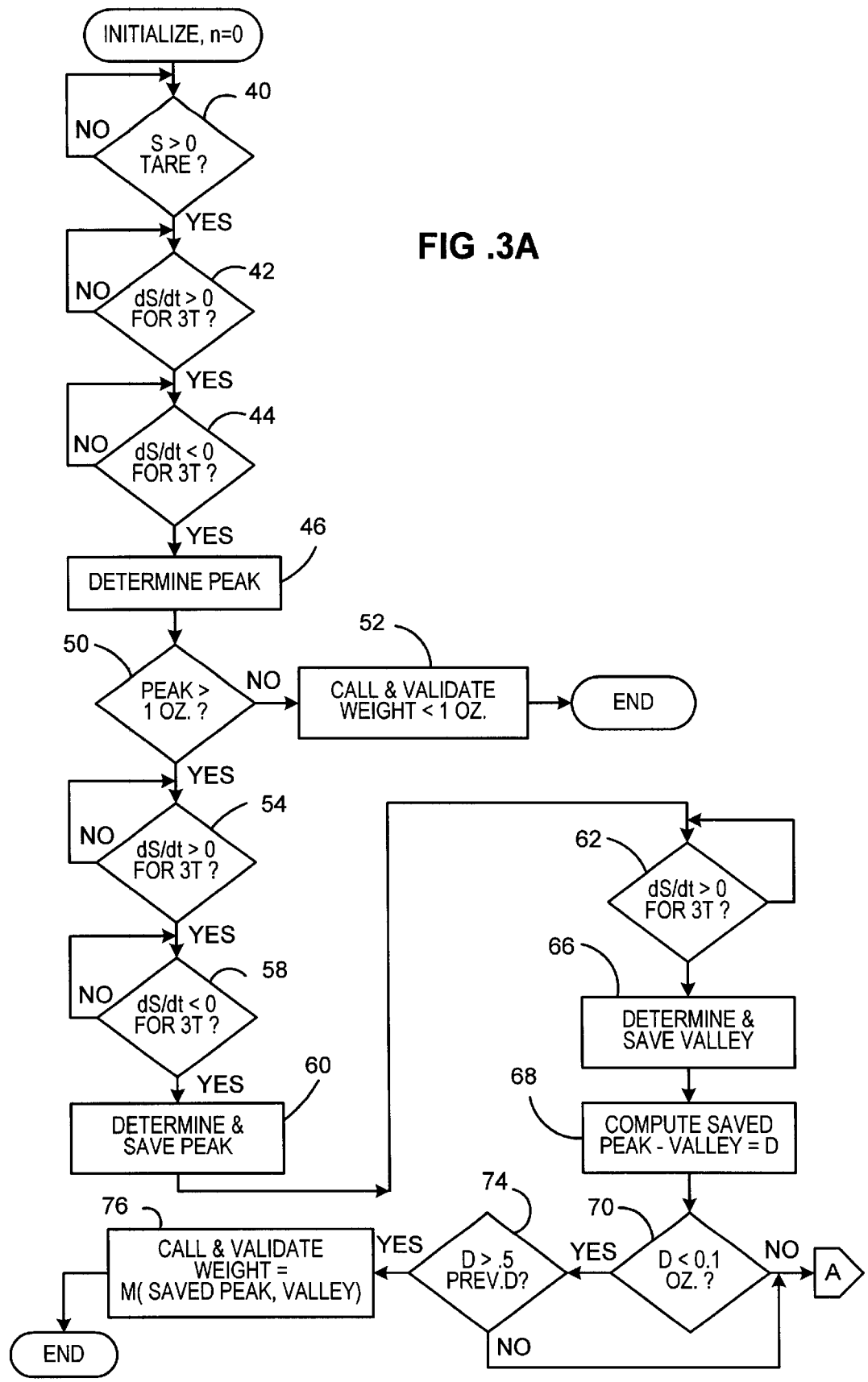
FIGS. 3A and 3B show a flow diagram of processing of the response of FIG. 2 by the scale system of FIG. 1 to determine the weight of a mailpiece.
Figure 3B:
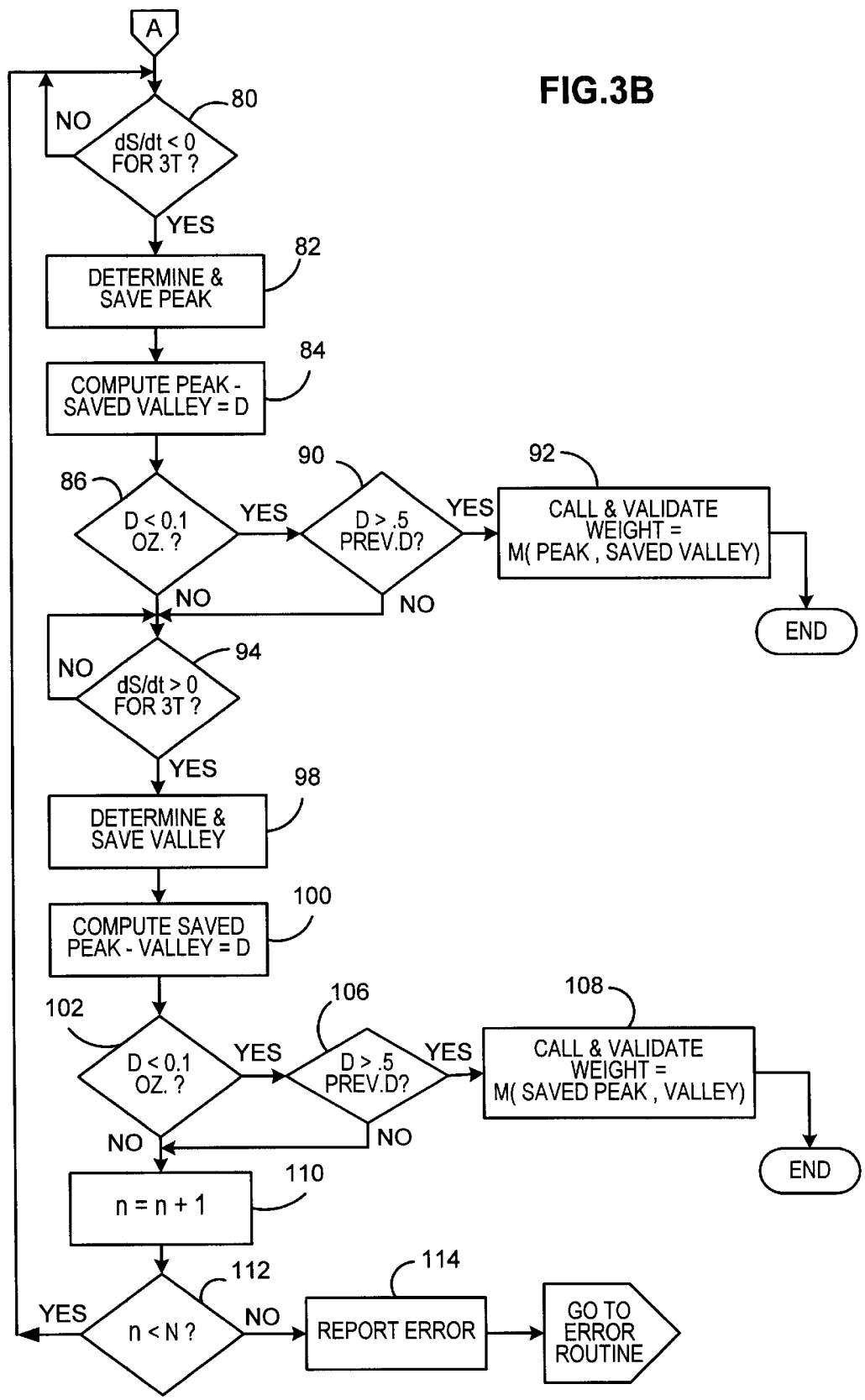

FIGS. 3A and 3B show a flow diagram for the operation of the microprocessor 30 in carrying out the algorithm described above with respect to FIG. 2. At step 40 microprocessor 30 tests determine if signal S is greater than the 0 tare and, if not, continues to loop through step 40. (Note that signal S is a sequence of digital values corresponding to samples of signal S(t). Preferably these signals are taken at one or two milliseconds intervals, which is approximately an order of magnitude less than the sample interval for previous scale systems, so that dS/dt can be satisfactorily approximated as the difference between successive sample values of signal S).

Once signal S is determined to be greater than 0 then, at step 42, microprocessor 30 determines if dS/dt is greater than 0 for 3 sample intervals. By requiring that dS/dt be greater than 0 for 3 intervals, small high frequency perturbations are filtered out. Microprocessor 30 remains at step 42 until the condition is satisfied and then goes to step 44 to then test if dS/dt is less than 0 for 3 sample intervals. Again, microprocessor 30 remains at step 44 until the condition is satisfied. Then at step 46 the peak is determined as the first value in the sequence of values identified at step 44, or in any other convenient manner.

Then at step 50 microprocessor 30 determines if the peak identified at step 46 is greater than the first break weight, which for the U.S. Postal Service is typically one ounce, and, if not, at step 52 calls and validates the weight as being less than one ounce, and exits. (Calling a weight, as used herein, means microprocessor 30 uses the current weight value to determine the postage for a mailpiece. Validating a weight, as used herein, means that microprocessor 30 calculates the net weight and insures that it is above 0 and within maximum scale limits.)

If the peak is greater than the first break weight B, then at step 54, microprocessor 30 again searches for three successive intervals where dS/dt is greater than 0, and, if not, continues to loop through step 54. Once the condition in step 54 has been satisfied, then in step 58 microprocessor 30 again searches for three successive intervals where dS/dt is less than 0, thereby identifying a second peak in signal S. Once the conditions at steps 54 and 58 are satisfied then at step 60 microprocessor 30 determines and saves the second peak.

Then at step 62 microprocessor 30 again searches for three successive intervals where dS/dt is greater than 0 to identify the next valley in signal S. Then at step 68 microprocessor 30 computes the difference between the peak value, saved at step 60, and the current valley value, determined at step 66.

At step 70 microprocessor 30 determines if this difference is less than a predetermined fraction of a minimum range, preferably less than 0.1 ounce and, if so, at step 74 determines if this difference is greater than $\frac{1}{2}$ of the difference between the previous peak and valley pair. The test at step 74, and the same test at other steps described below, form a second filter to assure that high frequency perturbations do not cause a false determination of a peak or valley. If both conditions at step 70 and step 74 are satisfied, then at step 76 microprocessor 30 calls and validates the weight as the median of the peak and valley pair used to compute the difference at step 68 and then exits. Otherwise microprocessor 30 goes to step 80 (shown in FIG. 3B).

At step 80 microprocessor 30 again tests to find 3 successive intervals where dS/dt is less than 0 to identify the next peak, and, if not, continues to loop through step 80. Once three successive intervals where dS/dt is less than 0 are found, microprocessor 30 at step 82 determines and saves the next peak. At step 84 microprocessor 30 computes the difference between the current peak, determined at step 82, and the valley, saved at step 66.

Then at step 86 microprocessor 30 again determines if the peak to valley difference is less than $\frac{1}{10}$ of an ounce, and at step 90 if the difference is greater than $\frac{1}{2}$ of the previous peak to valley distance. If both conditions are satisfied then at step 92 microprocessor 30 calls and validates the weight as the median of the peak and valley pair used to compute the difference step 84 and exits.

Otherwise, at step 94 microprocessor 30 again searches for three successive intervals where dS/dt is greater than 0, and, if not, continues to loop through step 94, to identify the next valley. Once 3 such intervals are found then, at step 98, microprocessor 30 determines and saves the valley. Then at step 100 microprocessor 30 computes the peak, saved at step 82, minus the current valley, determined at step 98.

Then at steps 102 and 106 microprocessor 30 again tests to determine if the difference computed at step 100 is less than $\frac{1}{10}$ ounce and greater than $\frac{1}{2}$ the previous difference and, if so, at step 108 calls and validates the weight as the median of the current peak, valley pair, and exits. Otherwise, at step 110 microprocessor 30 increments counter n, at step 112 tests to determine if n is less than predetermined value N. If so microprocessor 30 returns to step 80 to identify the next peak. Note that now the saved valley used at step 84 will be the value saved at step 100.

If counter n is not less than N than at step 114 microprocessor 30 reports an error and goes to an error routine to make a further effort to determine the mailpiece weight as will be described further below with regard to FIGS. 5 and 6. Preferably N is approximately 10.

Figure 4:
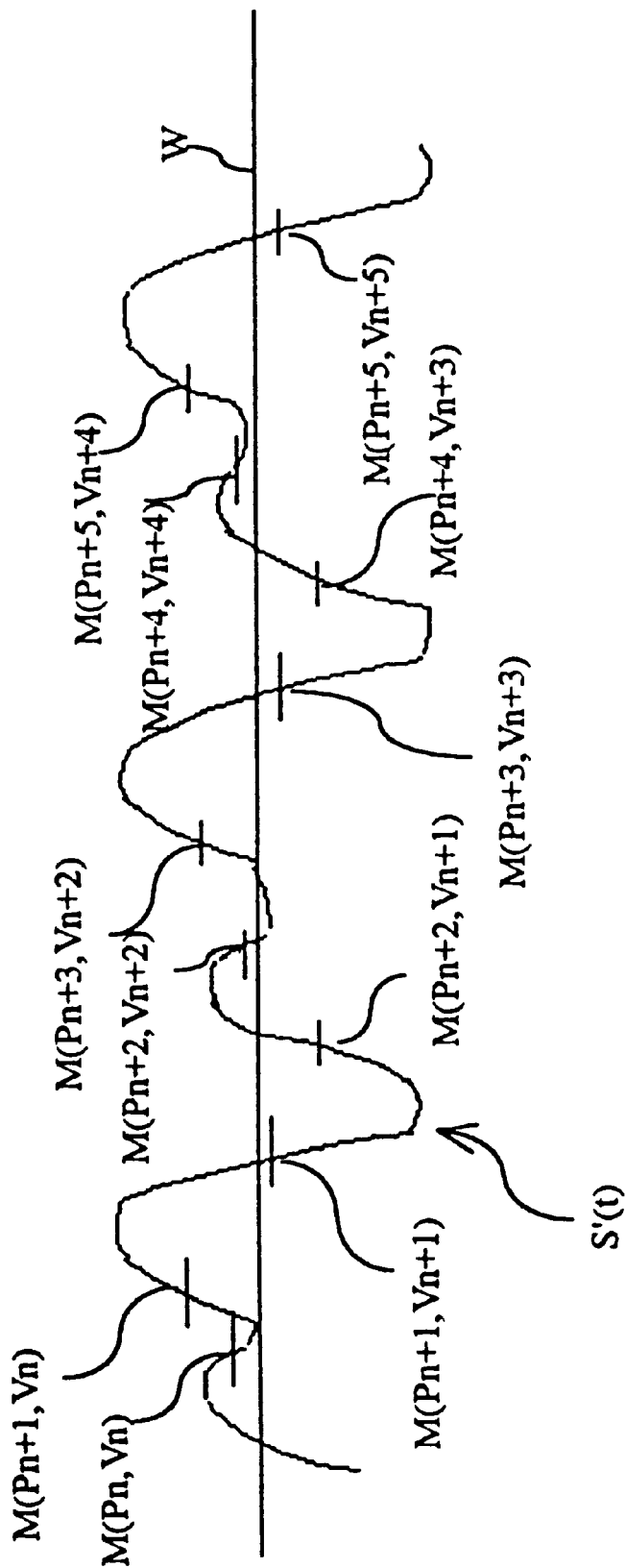
FIG. 4 shows a graphic representation of the response of the scale system of FIG. 1 to a mailpiece in the presence of external vibrations.

Failure of signal S to converge to a value of less than 1/10 ounce within N cycles is typically because of the presence of ground vibration. FIG. 4 shows a resulting output signal S'(t) which is the sum of the normal system response A exp $(-\alpha t)\sin(\omega t)$ and ground vibration which is assumed to have the form D $\sin(\phi(t+y))$. It is believed, as shown in FIG. 4, the resulting signal S'(t)=A exp $(-\alpha t)\sin(\omega t)$+D $\sin(\phi(t+y))$ will be periodic even though the amplitude and range of the signal will vary. Therefore, it is believed that the average of the medians between the resulting peaks and valleys of the signal, M(Pn,Vn), M(Pn+1,Vn), M(Pn+1,Vn+1) . . . , shown in FIG. 4, will vary about the weight W of the mailpiece so that an average over a number of cycles will give a reasonable estimate of weight W.

Figure 5:
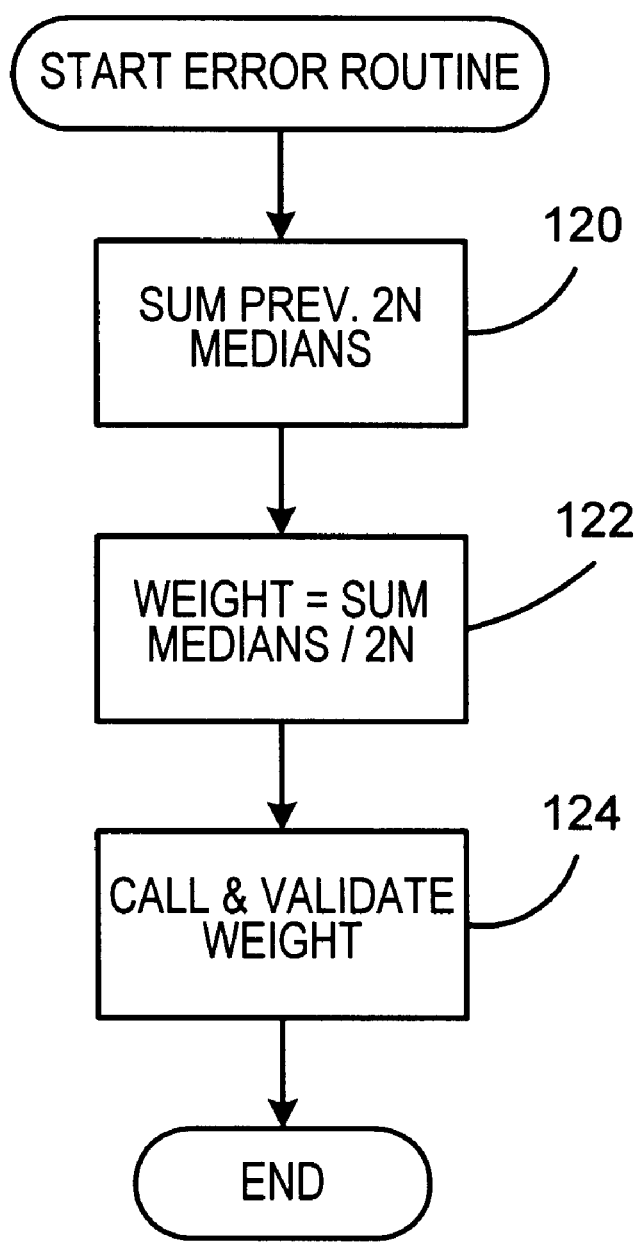
FIG. 5 shows a flow diagram of processing of the response of FIG. 4 by the scale system of FIG. 1 to determine the weight of a mailpiece in the presence of external vibration.
Figure 6:
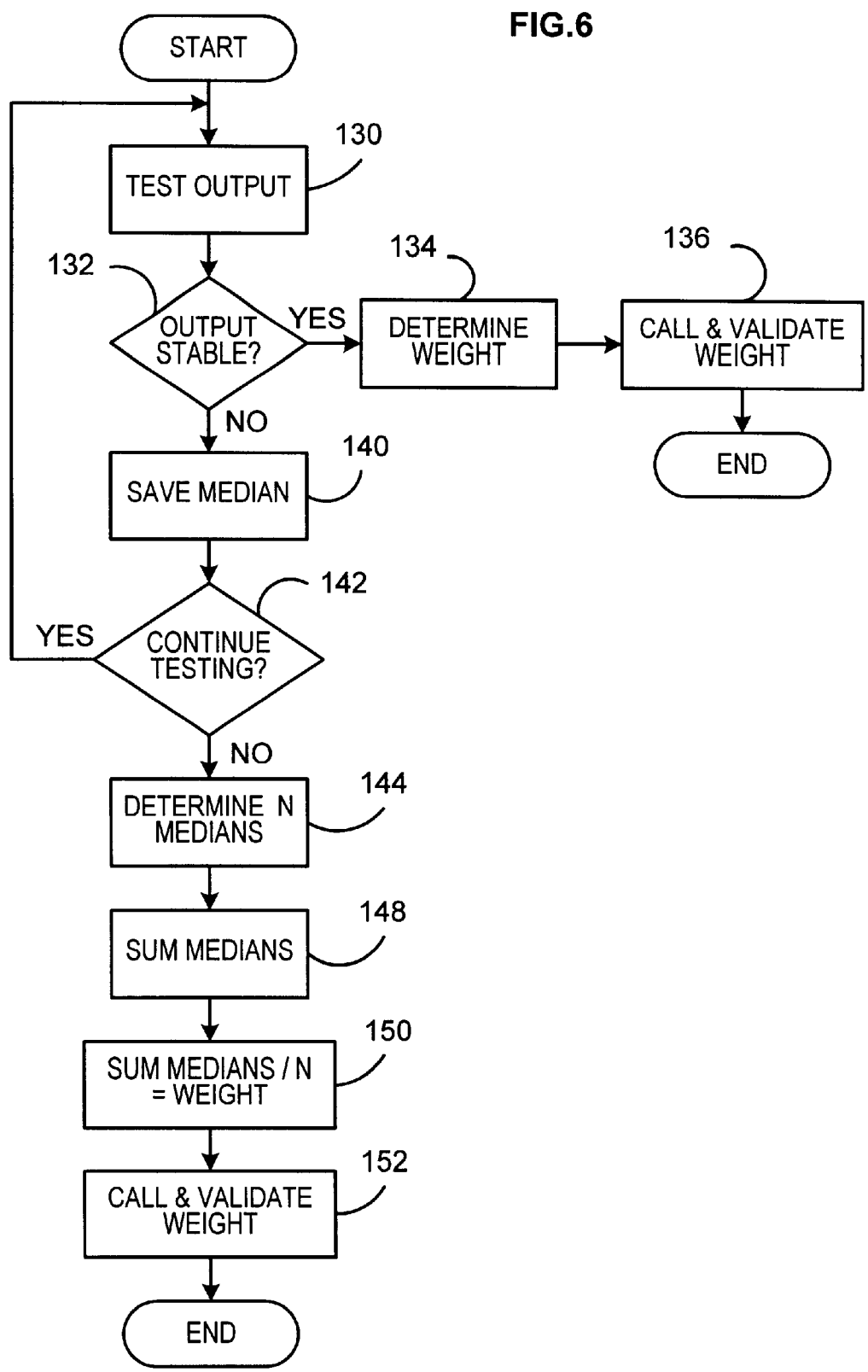
FIG. 6 shows a more general flow diagram of processing of the response of FIG. 4 in accordance with the present invention to determine the weight of a mailpiece in the presence of external vibration.

FIG. 5 shows a flow diagram for the operation of the microprocessor 30 in carrying out the algorithm described above with respect to FIG. 4. At step 120 microprocessor 30 sums the previous 2N medians. The medians are computed from the valley values stored by the weighing algorithm or, in other embodiments can be saved by the algorithm. Note that the value of the 2N is used because counter n is only incremented for every other peak valley pair. Then at step 122 microprocessor 30 estimates the weight of the mail piece to be the sum of the medians divided by 2N, and at step 124 calls and validates the weight, and then exits.

While the algorithm described above for determining weights when the digital output signal converges to a steady value is preferred, the present invention can be used to estimate weights in the presence of external vibration in conjunction with any convenient weighing algorithm for determining weights when the digital output signal converges. FIG. 6 shows a more general flow diagram of the use of the method of the present invention with any such convenient algorithm.

At step 130 microprocessor 30 tests the digital output to determine if it is approaching a steady value. Any convenient test such as peak to valley differences, which are less than a predetermined threshold, or convergence of sample values, can be used. If so, at step 132 microprocessor 30 determines if the output signal is converging, and, if so, determines the weight at step 134 and calls and validates the weight at step 136 in any convenient manner. Otherwise, if median values or corresponding peak and valley values are available, at step 140 microprocessor 30 saves the median values or the corresponding peak and valley values.

Then at step 142 microprocessor 30 determines if the digital output signal should be further tested, and, if so, returns to step 130, and otherwise goes to step 144. Determination if further testing is required can be made in any convenient manner such elapsed time, number of samples taken, or number of cycles examined.

At step 144 any additional computation or determination f any additional medians needed to reach the necessary number is carried out. In step 148 the N medians are summed, and in step 150 microprocessor 30 estimates the weight of the mail piece to be the sum of the medians divided by N. At, step 152 microprocessor 30 calls and validates the weight, and then exits.

The embodiments described above and illustrated in the attached drawings have been given by way of example and illustration only. From the teachings of the present application those skilled in the art will readily recognize numerous other embodiments in accordance with the subject invention. Particularly other modifications of various indicia printed with different geometries will be apparent. Accordingly, limitations on the subject invention are to be found only in the claims set forth below.

What is claimed is:

1. A system for determining a weight for an item, comprising:
    a) a scale system for generating a digital output signal, said scale system comprising:
        a1) a support for supporting said item; and
        a2) a transducer for generating said digital output signal, said signal being representative of an instantaneous response of said support having a general waveform of a damped sinusoid; and
    b) a data processing system for, in response to said digital output signal:
        b1) detecting presence of said item on said support;
        b2) determining if a first peak of said damped sinusoid is greater than a threshold value, said threshold value corresponding to a weight break between a lowest range of weight values and a second range of weight values;
        b3) if said first peak of said damped sinusoid is not greater than said threshold value, determining said weight to be in said lowest range of weight values;
        b4) if said first peak of said damped sinusoid is greater than said threshold value, determining if said damped sinusoid is approaching a steady value;
        b5) if said damped sinusoid is approaching a steady value, determining said weight to be equal to a function of said digital output signal,
        b6) if said damped sinusoid is not approaching a steady value, determining a predetermined number of medians of successive peak, valley pairs; and
        b7) determining said weight to be an average of said predetermined number of medians.

2. A system as described in claim 1 where said predetermined number is approximately 20.

3. A system as described in claim 1 where said peaks are identified by determining when a first derivative of said damped sinusoid changes from positive to negative, and said valleys are identified by determining when said first derivative changes from negative to positive.

4. A system as described in claim 3 where values for said predetermined number of medians, or values for corresponding peaks and valleys, are determined and stored prior to determining whether or not said digital output signal is approaching said steady value.

5. A system as described in claim 4 where, if said damped sinusoid is approaching said steady value, said weight is determined to be equal to a function of said predetermined number of medians.

6. A system as described in claim 1 further comprising a postage metering system responsive to said data processing system for franking said mailpieces, said postage meter responding to detection of said mailpiece on said support to debit a vault for a postage amount corresponding to said weight.

7. A system as described in claim 1 where values for said predetermined number of medians, or values for corresponding peaks and valleys, are determined and stored prior to determining whether or not said digital output signal is approaching said steady value.

8. A system as described in claim 7 where, if said damped sinusoid is approaching said steady value, said weight is determined to be equal to a function of said predetermined number of medians.

9. A method for determining a weight for an item in a scale system having a support for supporting said item and a transducer for generating a signal representative of an instantaneous response of said support having a general waveform of a damped sinusoid, said method comprising:

a) detecting presence of said item on said support;

b) determining if a first peak of said damped sinusoid is greater than a threshold value, said threshold value corresponding to a weight break between a lowest range of weight values and a second range of weight values;

c) if said first peak of said damped sinusoid is not greater than said threshold value, determining said weight to be in said lowest range of weight values;

d) if said first peak of said damped sinusoid is greater than said threshold value, determining if said damped sinusoid is approaching a steady value;

e) if said damped sinusoid is approaching a steady value, determining said weight to be equal to a function of said digital output signal;

f) if said damped sinusoid is not approaching a steady value, determining a predetermined number of medians of successive peak, valley pairs; and g) determining said weight to be an average of said predetermined number of medians.

10. A method as described in claim 9 where said predetermined number is approximately 20.

11. A method as described in claim 9 where said peaks are identified by determining when a first derivative of said damped sinusoid changes from positive to negative, and said valleys are identified by determining when said first derivative changes from negative to positive.

12. A method as described in claim 11 where values for said predetermined number of medians, or values for corresponding peaks and valleys, are determined and stored prior to determining whether or not said digital output signal is approaching said steady value.

13. A method as described in claim 12 where, if said damped sinusoid is approaching said steady value, said weight is determined to be equal to a function of said predetermined number of medians.

14. A method as described in claim 9, wherein said scale system is coupled to a postage metering system for franking said mailpieces, said method further comprising:

responding to detection of said mailpiece on said support to debit a vault for a postage amount corresponding to said weight.

15. A method as described in claim 9 where values for said predetermined number of medians, or values for corresponding peaks and valleys, are determined and stored prior to determining whether or not said digital output signal is approaching said steady value.

16. A method as described in claim 15 where, if said damped sinusoid is approaching said steady value, said weight is determined to be equal to a function of said predetermined number of medians.

\* \* \* \* \*